March 28, 1961   W. E. YATES ET AL   2,977,190
PRODUCTION OF ALKALI METAL PHOSPHATES AND CARBON DIOXIDE
Filed April 18, 1956
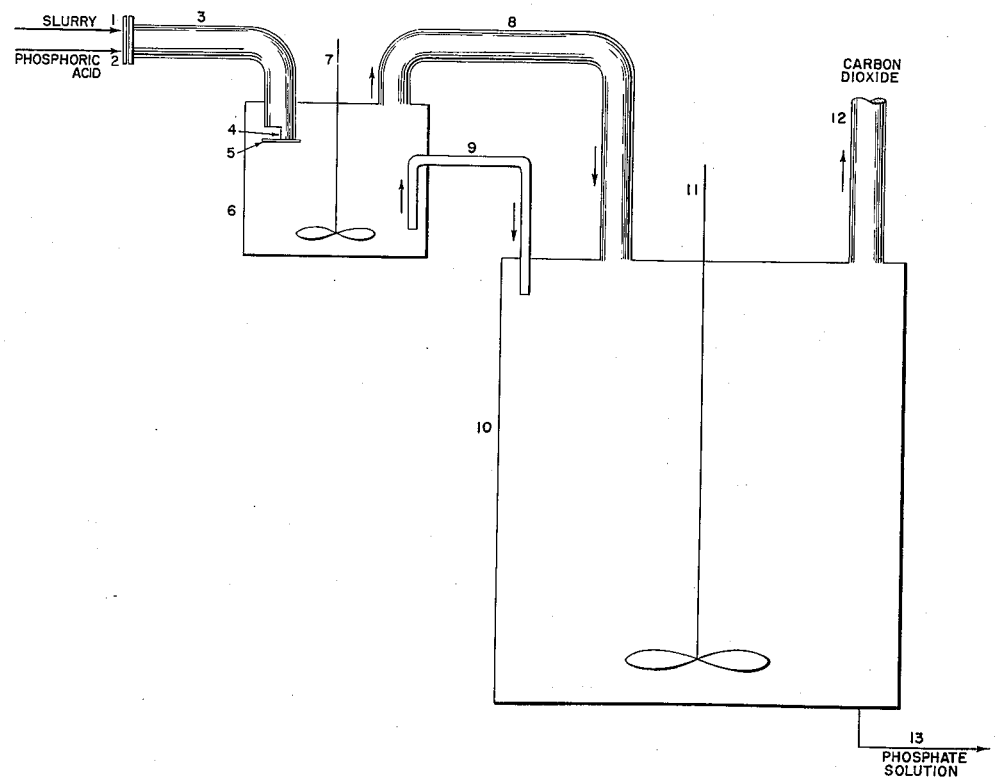
WILLIAM E. YATES
JAMES WILDING   INVENTORS.
JOHN L. MORROW
BY
Glenn W. Parsons
AGENT.

United States Patent Office 2,977,190
Patented Mar. 28, 1961

2,977,190

PRODUCTION OF ALKALI METAL PHOSPHATES AND CARBON DIOXIDE

William E. Yates, James Wilding, and John L. Morrow, Lawrence, Kans., assignors to Food Machinery and Chemical Corporation, New York, N.Y., a corporation of Delaware Filed Apr. 18, 1956, Ser. No. 578,957

7 Claims. (Cl. 23—107)

This invention relates to an improved method of reacting metal carbonates with phosphoric acid to produce alkali metal phosphates and high-purity carbon dioxide as a valuable by-product.

The reaction of various sodium carbonates with phosphoric acid is carried out on a large scale for the production of monosodium and disodium phosphates, which may be recovered and used as such or may be converted by further chemical reaction to trisodium phosphate or by heat treatment to tetrasodium pyrophosphate, sodium tripolyphosphate, sodium metaphosphate, etc. Other alkali metal phosphates are or may be prepared by reaction of the corresponding carbonate with phosphoric acid.

A co-product of the reaction of alkali metal carbonates and phosphoric acid is carbon dioxide, and it is valuable as a chemical intermediate and also for various other uses after conversion to the liquid or solid form. For utilization in any manner it is desirable that it be generated at a constant rate and in a state of high purity. In the past it has usually been wasted, partly on account of the fact that it was not generated at a steady rate and contained air and other contaminants.

The evolution of carbon dioxide during the reaction of alkali metal carbonates and phosphoric acid results in serious foaming problems. The problems are particularly acute when certain sodium carbonates containing traces of foam-inducing impurities are used. Because of the foaming problems it has been necessary to carry the reaction out batchwise with occasional interruption of the addition of the alkali metal carbonate to permit the foam to subside. It has been recognized that if the process could be made continuous small reaction equipment could be employed, labor and processing steam requirements could be reduced, and carbon dioxide of high purity could be produced at a steady rate. Equipment size is of considerable importance in producing phosphates from phosphoric acid and alkalis, since the equipment must be constructed of corrosion-resistant material, such as stainless steel.

It is an object of this invention to provide a continuous process for the reaction of alkali metal carbonates and phosphoric acid.

It is also an object of this invention to provide a process for the reaction of alkali metal carbonates and phorphoric acid free of the problems caused by foaming.

It is a further object of this invention to provide a process for the production of carbon dioxide at a constant rate and in a state of high purity from an alkali metal carbonate and an acid.

As used in the description of the process and in the claims, the term alkali metal carbonate includes all of the compounds which may be formed by the reaction of alkali metal hydroxides and carbonic acid. The term thus includes normal carbonates, acid carbonates, sesquicarbonates, etc., whether anhydrous or hydrated.

The process is based on the discovery that the problem of foaming can be largely eliminated by continuously passing an alkali metal carbonate and phosphoric acid concurrently into a tubular reactor in which a substantial part of the reaction occurs, and then passing the partially reacted mixture into an agitated tank reactor in which further reaction occurs and most of the carbon dioxide separates from the liquid. A third reactor, also of the agitated tank type and preferably larger than the first, may be used to secure substantially complete separation of carbon dioxide and liquid.

As used in this application, the term "tubular reactor" refers to an elongated reaction space, such as a pipe, into which reactants are introduced continuously at one end and removed continuously from the other end without substantial mixing of the reactants with previously introduced material. Where two streams are introduced, the material in stream A mixes with the simultaneously-introduced material in stream B, but does not mix in a substantial degree with material previously or subsequently introduced in stream A or B. The material may be said to pass through the reactor in piston flow.

In contrast, an "agitated tank reactor" is one in which the dimensions of the reaction space are those of a tank rather than of a pipe, and the material introduced is mixed with material previously introduced. The reactor is provided with an agitator or other means for causing the newly-introduced material to become mixed with material already in the tank.

In the process of the present invention, since the alkali metal carbonate and the phosphoric acid are introduced first into a tubular reactor, thereby avoiding dilution with previously introduced material, the first part of the reaction occurs in a minimum volume of material. This has the effect of giving a high rate of reaction, since the concentration of reactants is high. It also has the effect of minimizing the volume of liquid from which the carbon dioxide formed in the reaction must be separated.

While the readiness with which the carbon dioxide separates from the liquid in the effluent from the tubular reactor is not fully understood, it is believed to be related to the small volume of liquid in relation to the volume of carbon dioxide.

The fraction of the reaction occurring in the agitated tank reactors varies with the rate of throughput, but preferably is less than half of the total. The rate and other conditions are controlled so that the volume of gas formed in the agitated tank reactors is sufficiently small that it separates readily without causing significant foaming.

One embodiment of the process is illustrated in the accompanying drawing. Through lines 1 and 2 a sodium carbonate solution or slurry and phosphoric acid, respectively, are introduced into a first reactor 3 constructed of pipe. The reactor 3 is arranged so as to discharge through opening 4 into a reactor 6 of the agitated-tank type. A baffle 5 at opening 4, to deflect the incoming stream away from outlet 8 of reactor 6, may be formed by placing a plate over the end of reactor 3 and cutting away a semi-circumferential section of the pipe just above the plate. The cross-section of opening 4 is preferably at least as great as the cross-section of reactor 3 so that pressure is not built up in the reactor.

Reactor 6 is equipped with an agitator 7, an outlet 8 for carbon dioxide and water vapor, an outlet 9 for withdrawal of solution, and preferably a steam coil (not shown) for heating. Outlet 9 is of such size as not to form a siphon when solution passes through it.

Outlet 8 and outlet 9 both discharge into a second, larger agitated-tank reactor 10. Carbon dioxide and water vapor leave the system through outlet 12 and phosphate solution is removed through outlet 13. Reactor 10 also contains a steam coil (not shown).

In a preferred mode of operation for the production of sodium phosphate, a sodium carbonate slurry is pumped through line 1 into reactor 3. The use of a slurry rather than a solution reduces the amount of water added to the system. This is desirable since any water added must ultimately be separated from the product. The slurry may be prepared by adding one part or even more of sodium carbonate, by weight, to each part of water. When equal weights of water and sodium carbonate are mixed ("50% slurry") and heated to a temperature approaching the boiling point, approximately one-half of the sodium carbonate will be dissolved and the remainder will be in suspension. Slurries having concentrations as high as 63% have been used.

Reactor 3 is suitably constructed of pipe several inches in diameter, the actual size varying with the throughput. For a large scale operation the diameter may be six to eight inches. The diameter should be small enough to result in a liquid velocity great enough to prevent settling out of alkali metal carbonate when the latter is used in slurry form.

The length of reactor 3 should be such that at least 50% of the reaction is completed in it. A length of 3 to 4 feet is sufficient in most instances, but a greater length may be used if desired.

The inlet pipes in reactor 3 should be arranged so that the phosphoric acid and the alkali carbonate are mixed as they enter the reactor. Ordinarily, adequate mixing of the two streams is obtained if the inlets are in close proximity. Mixing is aided by the formation of a large volume of carbon dioxide in the reaction.

A large capacity for reactor 6 is not required. Normally a capacity of 100 to 200 gallons is sufficient. Reactor 10 could also be of relatively small size, but a substantial capacity is desirable to permit both the reaction and the separation of carbon dioxide from the solution to approach 100%.

When producing sodium phosphates, the alkali metal carbonate used as a reactant may be sodium carbonate, sodium bicarbonate, or sodium sesquicarbonate. Other alkali metal carbonates that may be used include potassium carbonate, potassium bicarbonate, lithium carbonate, lithium bicarbonate, etc. The carbonates may be added in solution or slurry form or in dry form. The dry form is not preferred, however, since it is difficult to avoid the introduction of some air, which would contaminate the carbon dioxide, along with the carbonate, and also because the reaction is less rapid, due to the time required for dissolution of the entire amount of the carbonate.

Phosphoric acid of about 75% strength is preferred, but stronger or weaker acid may be used. Concentrations below 50% are in general to be avoided because they result in relatively dilute solutions of the product. The temperature of the phosphoric acid is not critical and may vary from ordinary temperature to 100° C. or even higher.

As indicated, it is advantageous to feed the alkali metal carbonate in the form of a slurry. The temperature of the slurry should preferably be near the boiling point so as to insure a rapid rate of reaction in the tubular reactor. However, lower temperatures may be used if desired.

In general, acid and slurry concentrations are chosen so as to produce a concentrated solution of the product, but without precipitation of product during the reaction. If desired, the concentration of the product solution may be varied or adjusted by adding a separate stream of water to the first reactor or to one of the later reactors.

If desired, other materials may be added along with the alkali metal carbonate and phosphoric acid to reactor 3 or to any of the later reactors, provided such added materials do not increase the foaming tendency of the liquid. For example, off-grade product may be added to reactor 3 and re-processed to produce standard grade material.

Substantially the same pressure is maintained in each of the reactors. This pressure is preferably about atmospheric, although lower or higher pressures may be used if desired.

Example I

Sodium carbonate slurry and phosphoric acid were pumped into one end of a first reactor consisting of a 3.5-foot length of 8-inch diameter stainless steel pipe placed in a horizontal position. The reaction mixture was discharged from the opposite end of the pipe through an opening, having a cross-sectional area equal to that of the pipe, into a second reactor. The sodium carbonate slurry was prepared by mixing approximately 60 parts by weight of anhydrous sodium carbonate with 40 parts of water and was fed at a temperature of 95° C. and at a rate corresponding to 12,000 pounds $Na_2CO_3$ per hour. Phosphoric acid of 75% concentration was fed at a temperature of 40° C. and at a rate corresponding to 13,300 pounds $H_3PO_4$ per hour. The temperature in the first reactor was about 78° C. The ratio of the reactants was such as to produce a mixture of disodium phosphate and monosodium phosphate in the ratio of approximately two moles of the former to one mole of the latter. Such a mixture is useful in the production of sodium tripolyphosphate.

The reaction mixture from the first reactor was passed into a second reactor consisting of a 120-gallon tank equipped with an agitator. The temperature of the reaction mixture was raised by the use of steam to approximately 88° C., for the purpose of obtaining more complete reaction. The reaction was approximately 72% complete in the mixture entering the second reactor and approximately 90% complete in the mixture leaving this reactor.

From the second reactor the liquid passed through an overflow pipe into a third reactor consisting of a tank 12 feet in diameter and 12 feet high, and the carbon dioxide passed through an overhead conduit into the gas space of the same tank. The third reactor was provided with an agitator and also with closed steam coils which were used to raise the temperature of the solution to approximately 100° C. Further reaction occurred in this tank, raising the total reaction to 99% or more of completion. The phosphate solution was withdrawn from the bottom of the tank for further processing, and carbon dioxide was withdrawn from the top. After cooling to condense the water vapor, the purity of the carbon dioxide was above 99% and it was used to produce Dry Ice.

In other runs in the same equipment, sodium carbonate was fed at rates as high as 22,500 pounds per hour.

Example II

A batch reaction was carried out in a tank 12 feet x 12 feet similar to the one used as the third reactor in the preceding example. Water and approximately 4000 pounds of dry sodium carbonate were added to fill the tank to a depth of 2 feet and the agitator was started. Sodium carbonate and phosphoric acid were then added simultaneously in amounts to produce a mixture of disodium phosphate and monosodium phosphate in the approximate proportions of two to one. The mixture was maintained at approximately 100° C.

By the time the tank was half filled with liquid the foam had reached the top of the tank, and it was necessary to reduce the rate of addition of reactants to permit the foam to subside. Intermittent addition of reactants was continued as rapidly as foaming permitted until a total of 32,400 pounds of sodium carbonate had been added. The time required for the addition was 6 hours, the average rate of addition being 5,400 pounds per hour.

With allowance for the time required to empty the tank and start a new batch, the average rate of addition over the entire cycle was 3,000 pounds per hour, compared with a maximum of 22,500 pounds per hour in the system of Example I.

In the batch process, air entered the tank during interruptions in the sodium carbonate addition and this reduced the purity of the carbon dioxide collected, rendering it unsatisfactory for conversion to Dry Ice.

*Example III*

The procedure of Example I was carried out without the use of the first and second reactors, the sodium carbonate and the phosphoric acid being added continuously to, and product withdrawn continuously from, the large tank. The maximum rate at which sodium carbonate could be added was approximately 6,000 pounds per hour, and the foam layer was approximately 5 feet deep.

The volume of the first and second reactors is inconsequential compared with the third reactor, but by placing the first and second reactors ahead of the large reactor, the capacity of the latter is increased about four-fold or even more.

While the process has been illustrated by a system in which the tubular reactor is followed by two tank reactors, the principal advantages of the process can be obtained using only one tank reactor in addition to the tubular reactor. However, to obtain maximum capacity per unit of total volume of the system, the tubular reactor should be followed by two or more tank reactors.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for the continuous production of an alkali metal phosphate solution and substantially pure carbon dioxide, which comprises: continuously introducing phosphoric acid, an alkali metal carbonate and water into one end of an elongated reaction zone, reacting a substantial portion of said acid and said carbonate in said elongated reaction zone to yield carbon dioxide and alkali metal phosphate, discharging the reaction mixture into a body of gas maintained in a second reaction zone in which an agitated body of liquid is maintained below the body of gas, whereby the carbon dioxide formed in said elongated reaction zone separates from the reaction mixture discharged into the body of gas while the discharged liquid from said reaction mixture is falling into said agitated body of liquid, reacting the components of said discharged liquid in said second reaction zone to yield additional carbon dioxide and alkali metal phosphate, whereupon said additional carbon dioxide separates from the reaction mixture without substantial foaming, continuously discharging substantially pure carbon dioxide from the top of said second reaction zone, and continuously discharging alkali metal phosphate solution from the lower part of said reaction zone, whereby said alkali metal phosphate and said carbon dioxide are produced in amounts of at least four times as great as the amounts produced by equivalent single batch reactors, and recovering said carbon dioxide and said alkali metal phosphates.

2. A process for the continuous production of sodium phosphate solution and substantially pure carbon dioxide, which comprises: continuously introducing phosphoric acid, sodium carbonate and water into one end of an elongated reaction zone, reacting a substantial portion of said acid and said carbonate in said elongated reaction zone to yield carbon dioxide and sodium phosphate, discharging the reaction mixture into a body of gas maintained in a second reaction zone in which an agitated body of liquid is maintained below the body of gas, whereby the carbon dioxide formed in said elongated reaction zone separates from the reaction mixture discharged into the body of gas while the discharged liquid from said reaction mixture is falling into said agitated body of liquid, reacting the components of said discharged liquid in said second reaction zone to yield additional carbon dioxide and sodium phosphate, whereupon said additional carbon dioxide separates from the reaction mixture without substantial foaming, continuously discharging substantially pure carbon dioxide from the top of said second reaction zone, and continuously discharging sodium phosphate solution from the lower part of said second reaction zone, whereby said sodium phosphate and said carbon dioxide are produced in amounts of at least four times as great as the amounts produced by equivalent single batch reactors, and recovering said carbon dioxide and said sodium phosphate.

3. A process for the continuous production of sodium phosphate solution and substantially pure carbon dioxide which comprises: continuously introducing phosphoric acid and an aqueous sodium carbonate solution into one end of an elongated reaction zone, reacting a substantial portion of said acid and said carbonate in said elongated reaction zone to yield carbon dioxide and sodium phosphate, discharging the reaction mixture into a body of gas maintained in a second reaction zone in which an agitated body of liquid is maintained below the body of gas, deflecting the mixture against the side of said second reaction zone, whereby the carbon dioxide formed in said elongated reaction zone separates from the reaction mixture discharged into the body of gas while the discharged liquid from said reaction mixture is falling into said agitated body of liquid, reacting the components of said discharged liquid in said second reaction zone to yield additional carbon dioxide and sodium phosphate, whereupon said additional carbon dioxide separates from the reaction mixture without substantial foaming, continuously discharging substantially pure carbon dioxide from the top of said reaction zone, and continuously discharging sodium phosphate solution from the lower part of said second reaction zone, whereby said sodium phosphate and said carbon dioxide are produced in amounts of at least four times as great as the amounts produced by equivalent single batch reactors, and recovering said carbon dioxide and said sodium phosphate.

4. A process for the continuous production of sodium phosphate solution and substantially pure carbon dioxide which comprises: continuously introducing phosphoric acid and a sodium carbonate slurry into one end of an elongated reaction zone, reacting said acid and said carbonate in said elongated reaction zone to at least 50% of the completed reaction to yield carbon dioxide and sodium phosphate, discharging the reaction mixture into a body of gas maintained in a second reaction zone in which an agitated body of liquid is maintained below the body of gas, deflecting the mixture against the side of said second reaction zone, whereby the carbon dioxide formed in said elongated reaction zone separates from the reaction mixture discharged into the body of gas while the discharged liquid from said reaction mixture is falling into said agitated body of liquid, reacting the components of said discharged liquid in said second reaction zone to yield additional carbon dioxide and sodium phosphate, whereupon said additional carbon dioxide separates from the reaction mixture without substantial foaming, continuously discharging substantially pure carbon dioxide from the top of said second reaction zone and continuously discharging alkali metal phosphate solution from the lower part of said second reaction zone, whereby said sodium phosphate and said carbon dioxide are produced in amounts of at least four times as great as the amounts produced by equivalent single batch reactors, and recovering said carbon dioxide and said sodium phosphate.

5. A process for the continuous production of alkali metal phosphate solution and substantially pure carbon dioxide which comprises: continuously introducing phosphoric acid, an alkali metal carbonate and water into one end of an elongated reaction zone, reacting a substantial portion of said acid and said carbonate in said elongated reaction zone to yield carbon dioxide and alkali metal phosphate, discharging the reaction mixture into a body of gas maintained in a second reaction zone in which an agitated body of liquid is maintained below the body of gas, deflecting the mixture against the side of said second reaction zone, whereby the carbon dioxide formed in said elongated reaction zone separates from the reaction mixture discharged into the body of gas while the discharged liquid from said reaction mixture is falling into said agitated body of liquid, reacting the components of said discharged liquid in said second reaction zone to yield additional carbon dioxide and alkali metal phosphate, whereupon said additional carbon dioxide separates from the reaction mixture without substantial foaming, continuously passing carbon dioxide from the top of said second reaction zone into the upper gas space of an agitated third reaction zone, continuously passing the reaction mixture from the lower part of said second reaction zone into said agitated third reaction zone, continuously withdrawing carbon dioxide from the top of said third reaction zone and continuously withdrawing alkali metal phosphate solution from the lower part of said third reaction zone, whereby said alkali metal phosphate and said carbon dioxide are produced in amounts of at least four times as great as the amounts produced by equivalent single batch reactors, and recovering said carbon dioxide and said alkali metal phosphate.

6. A process for the continuous production of sodium phosphate solution and substantially pure carbon dioxide, which comprises: continuously introducing phosphoric acid and a sodium carbonate slurry into one end of an elongated reaction zone, reacting said acid and said carbonate in said elongated reaction zone to at least 50% of the completed reaction to yield carbon dioxide and sodium phosphate, discharging the reaction mixture into a body of gas maintained in a second reaction zone in which an agitated body of liquid is maintained below the body of gas, deflecting the mixture against the side of said second reaction zone, whereby the carbon dioxide formed in said elongated reaction zone separates from the reaction mixture discharged into the body of gas while the discharged liquid from said reaction mixture is falling into said agitated body of liquid, raising the temperature of the reaction mixture to approximately 90° C., reacting the components of said discharged liquid in said second reaction zone to yield additional carbon dioxide and sodium phosphate, whereupon said additional carbon dioxide separates from the reaction mixture without substantial foaming, continuously passing carbon dioxide from the top of said second reaction zone into the upper gas space of an agitated third reaction zone, continuously passing the reaction mixture from the lower part of said second reaction zone into said agitated third reaction zone, raising the temperature of the reaction mixture to approximately 100° C., continuously withdrawing carbon dioxide from the top of said third reaction zone and continuously withdrawing sodium phosphate solution from the lower part of said third reaction zone, whereby said sodium phosphate and said carbon dioxide are produced in amounts of at least four times as great as the amounts produced by equivalent single batch reactors, and recovering said carbon dioxide and said sodium phosphate.

7. A process for the continuous production of substantially pure carbon dioxide which comprises: continuously introducing an alkali metal carbonate slurry and phosphoric acid into one end of an elongated reaction zone, reacting a substantial portion of said acid and said carbonate in said elongated reaction zone to yield carbon dioxide and an alkali metal phosphate, discharging the reaction mixture into a body of gas maintained in a second reaction zone in which an agitated body of liquid is maintained below the body of gas, deflecting the mixture against the side of said second reaction zone, whereby the carbon dioxide formed in said elongated reaction zone separates from the reaction mixture discharged into the body of gas while the discharged liquid from said reaction mixture is falling into said agitated body of liquid, reacting the components of said discharged liquid in said second reaction zone to yield additional carbon dioxide, whereupon said additional carbon dioxide separates from the reaction mixture without substantial foaming, continuously discharging substantially a pure carbon dioxide from the top of said second reaction zone and continuously discharging solution from the lower part of said second reaction zone, whereby said alkali metal phosphate and said carbon dioxide are produced in amounts of at least four times as great as the amounts produced by equivalent single batch reactors, and recovering said carbon dioxide and said alkali metal phosphates.

References Cited in the file of this patent

UNITED STATES PATENTS

| | | |
|---|---|---|
| 1,688,112 | Booth et al. | Oct. 16, 1928 |
| 1,893,437 | Ober et al. | Jan. 3, 1933 |
| 2,698,219 | Martin | Dec. 28, 1954 |
| 2,747,964 | Bacon et al. | May 29, 1956 |

OTHER REFERENCES

Industrial and Engineering Chemistry, Tri-sodium phosphate, F. D. Snell, vol. 23, No. 5, pages 470–474, May 1931.

UNITED STATES PATENT OFFICE
CERTIFICATE OF CORRECTION

Patent No. 2,977,190            March 28, 1961

William E. Yates et al.

It is hereby certified that error appears in the above numbered patent requiring correction and that the said Letters Patent should read as corrected below.

Column 1, line 27, for "carbonate" read -- carbonates --; lines 58 and 59, for "phorphoric" read -- phosphoric --; column 5, line 57, after "said", first occurrence, insert -- second --.

Signed and sealed this 5th day of September 1961.

(SEAL)
Attest:

ERNEST W. SWIDER
Attesting Officer

DAVID L. LADD
Commissioner of Patents

USCOMM-DC